US011211016B2

(12) United States Patent
Chou et al.

(10) Patent No.: US 11,211,016 B2
(45) Date of Patent: Dec. 28, 2021

(54) SOURCE DRIVER

(71) Applicant: Novatek Microelectronics Corp., Hsinchu (TW)

(72) Inventors: Chih-Hsien Chou, Hsinchu (TW); Jhih-Siou Cheng, New Taipei (TW); Jin-Yi Lin, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/512,413

(22) Filed: Jul. 16, 2019

(65) Prior Publication Data

US 2020/0020282 A1 Jan. 16, 2020

Related U.S. Application Data

(60) Provisional application No. 62/698,302, filed on Jul. 16, 2018.

(51) Int. Cl.
*G06F 1/00* (2006.01)
*G09G 3/3291* (2016.01)

(52) U.S. Cl.
CPC ... *G09G 3/3291* (2013.01); *G09G 2310/0291* (2013.01); *G09G 2330/08* (2013.01)

(58) Field of Classification Search
CPC ...... G09G 3/3291; G09G 3/3208; G09G 3/32; G09G 2330/08; H03F 3/45
See application file for complete search history.

(56) References Cited

U.S. PATENT DOCUMENTS

| | | | |
|---|---|---|---|
| 7,639,073 B2 | 12/2009 | Deng et al. |
| 7,642,846 B2 | 1/2010 | Yan |
| 7,777,573 B2 | 8/2010 | Lee |
| 8,638,163 B2 | 1/2014 | Kim et al. |
| 9,530,356 B2 | 12/2016 | Min et al. |
| 2009/0128232 A1 | 5/2009 | Deng et al. |
| 2009/0295486 A1 | 12/2009 | Lee |
| 2010/0109774 A1 | 5/2010 | Nishimura et al. |

(Continued)

FOREIGN PATENT DOCUMENTS

| | | |
|---|---|---|
| CN | 101145781 | 3/2008 |
| CN | 101594118 | 12/2009 |

(Continued)

OTHER PUBLICATIONS

"Office Action of Taiwan Counterpart Application", dated May 13, 2020, p. 1-p. 10.

(Continued)

*Primary Examiner* — Michael A Faragalla
(74) *Attorney, Agent, or Firm* — JCIPRNET

(57) ABSTRACT

A source driver is configured to drive an organic light-emitting diode (OLED) display panel. The source driver includes a sensing circuit and an operational amplifier. The sensing circuit is configured to sense pixel information of an OLED pixel circuit through a sensing line of the OLED display panel. The operational amplifier includes an amplifier circuit and at least one switch circuit. The amplifier circuit includes at least one gain circuit. An input terminal of the amplifier circuit is coupled to an output terminal of the sensing circuit. Each of the at least one switch circuit is coupled between a pair of output terminals of a corresponding one of the at least one gain circuit.

14 Claims, 4 Drawing Sheets

(56) References Cited

U.S. PATENT DOCUMENTS

| | | | | |
|---|---|---|---|---|
| 2013/0069714 | A1 | 3/2013 | Kim et al. | |
| 2015/0035813 | A1* | 2/2015 | Lei | G09G 3/3208 345/205 |
| 2015/0091888 | A1* | 4/2015 | Min | G09G 3/3291 345/212 |
| 2018/0190698 | A1* | 7/2018 | Na | H01L 29/732 |

FOREIGN PATENT DOCUMENTS

| | | |
|---|---|---|
| CN | 103000220 | 3/2013 |
| CN | 104347027 | 2/2015 |
| CN | 104517566 | 4/2015 |
| TW | I433455 | 4/2014 |
| TW | 201506873 | 2/2015 |

OTHER PUBLICATIONS

"Office Action of Taiwan Counterpart Application", dated Apr. 20, 2021, pp. 1-11.
"Office Action of China Counterpart Application", dated Oct. 28, 2021, p. 1-p. 9.

* cited by examiner

SOURCE DRIVER

CROSS-REFERENCE TO RELATED APPLICATION

This application claims the priority benefit of U.S. provisional application Ser. No. 62/698,302, filed on Jul. 16, 2018. The entirety of the above-mentioned patent application is hereby incorporated by reference herein and made a part of this specification.

BACKGROUND

Field of the Invention

The invention relates to a display apparatus and more particularly, to a source driver configured to drive an organic light-emitting diode (OLED) display panel.

Description of Related Art

In an organic light-emitting diode (OLED) display device, a thin film transistor (TFT) or an OLED in a pixel circuit decays along with time, and thus, a source driver has to perform detection and compensation on the pixel circuit. Generally, an operational amplifier in the source driver senses pixel information of an OLED pixel circuit through a sensing line of an OLED display panel, and then, the operational amplifier transmits the pixel information to an analog-to-digital converter (ADC). The ADC converts the pixel information into digital data. This digital data is returned to a system on chip (SoC). The SoC may calculate a compensated driving voltage level according to the digital data and return it to the source driver, thereby achieving compensation.

In the source driver, the operation amplifier generally has an offset error, and this offset error may affect the performance of the overall system. Thus, how to perform offset cancellation on the operational amplifier is one of the technical subjects studied by people in the field. Particularly, defects of a certain pixel circuit (or some pixel circuits) may usually affect the offset cancellation operation, which causes errors to values (pixel information) sensed by a next pixel circuit.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a source driver, capable of mitigating influence of pixel information of a previous pixel circuit on pixel information of a current pixel circuit.

According to an embodiment of the invention, a source driver configured to drive an organic light-emitting diode (OLED) display panel is provided. The source driver includes a sensing circuit and an operational amplifier. The sensing circuit is configured to sense pixel information of an OLED pixel circuit through a sensing line of the OLED display panel. The operational amplifier includes an amplifier circuit and at least one switch circuit. The amplifier circuit includes at least one gain circuit. An input terminal of the amplifier circuit is coupled to an output terminal of the sensing circuit. Each of the at least one switch circuit is coupled between a pair of output terminals of a corresponding one of the at least one gain circuit.

Based on the above, the source driver provided by the embodiments of the invention has the switch circuit. The switch circuit is coupled to the pair of output terminals of one of the gain circuits of the amplification circuit. In a reset phase, the switch circuit can influence (e.g., reset) output voltages of the pair of output terminals. Thus, the source driver can mitigate the influence of the pixel information of the previous pixel circuit on the pixel information of the current pixel circuit.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
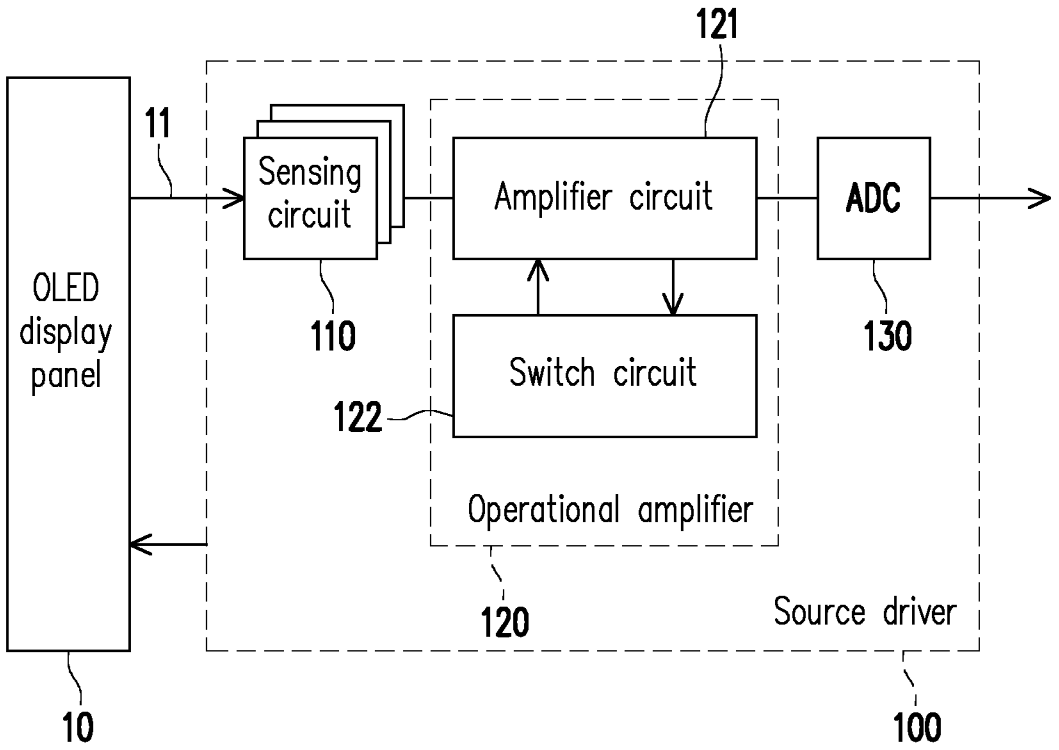
FIG. 1 is a schematic circuit block diagram illustrating a source driver according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a source driver 100 according to an embodiment of the invention. The source driver 100 may be used to drive an organic light emitting diode (OLED) display panel 10. The details related to the source driver 100 driving the OLED display panel 10 are not limited in the present embodiment. Based on a design requirement, for example, the source driver 100 may be disposed with conventional source driving circuits or other driving circuits, so as to drive a plurality of source lines (data lines) of the OLED display panel 10.

In the embodiment illustrated in FIG. 1, the source driver 100 includes a sensing circuit 110, an operational amplifier 120 and an analog-to-digital converter (ADC) 130. The sensing circuit 110 may sense pixel information of an OLED pixel circuit (not shown) in the OLED display panel 10 through a sensing line 11 of the OLED display panel 10. The implementation manner of the OLED pixel circuit is not limited in the present embodiment. Based on a design requirement, for example, the OLED pixel circuit may be a conventional pixel circuit or other pixel circuits.

The operational amplifier 120 is coupled to the sensing circuit 110 to receive the pixel information. Namely, the sensing circuit 120 may sense the pixel information of the OLED pixel circuit (not shown) through the sensing line 11 of the OLED display panel 10, and then, the operational amplifier 120 may transmit the pixel information to the ADC 130. The ADC 130 may convert the pixel information into digital data. The digital data may be processed to generate a compensated driving voltage level according to the digital data, and the compensated driving voltage level can be returned to the source driver 100, thereby achieving compensation.

In the embodiment illustrated in FIG. 1, the operational amplifier 120 includes an amplifier circuit 121 and a switch circuit 122. An input terminal of the amplifier circuit 121 is coupled to an output terminal of the sensing circuit 110 to receive the pixel information. The amplifier circuit 121 includes at least one gain circuit. For example, in some embodiments, the amplifier circuit 121 includes a plurality of gain circuits comprising a first gain circuit and a second gain circuit connected in series with each other. Preferably but not limitedly, the first gain circuit may be served as an input stage of the amplifier circuit 121, and the second gain circuit may be served as an output stage of the amplifier circuit 121. In some other embodiments, the amplifier circuit 121 includes a first gain circuit, at least one second gain circuit and a third gain circuit that are connected in series with one another, wherein the first gain circuit may be served as the input stage of the amplifier circuit 121, each of the at least one second gain circuit may be served as a middle stage (or a gain stage) of the amplifier circuit 121, and the third gain circuit may be served as the output stage of the amplifier circuit 121.

The switch circuit 122 is coupled between a pair of output terminals of a corresponding one of the gain circuits of the amplification circuit 121. In other embodiments, a plurality of switch circuits can be disposed, each of which can be coupled to a pair of output terminals of a corresponding one of the gain circuits. In a reset phase, the switch circuit 122 may influence (e.g., reset) output voltages of the pair of output terminals. For example (but not limited to), in the reset phase, the switch circuit 122 may pull the output voltages output by the pair of output terminals of the corresponding gain circuit to a certain voltage in the reset phase. The certain voltage has a level which may be determined based on a design requirement. The certain voltage can be at a level between original levels of the pair of the output terminals of the corresponding gain circuit.

In some embodiments, the switch circuit 122 may be turned on to influence the pair of output voltages output by the pair of output terminals of the corresponding gain circuit in a first period of the reset phase and can be turned off to stop influencing the pair of output voltages in a second period of the reset phase. In the same or other embodiments, the switch circuit 122 may be turned on to influence the pair of output voltages output by the pair of output terminals of the corresponding gain circuit during the reset phase (for at least some time of the reset phase) and can be turned off to stop influencing the pair of output voltages in an amplification phase. Thus, the source driver may mitigate the influence of pixel information of a previous pixel circuit on pixel information of a current pixel circuit.

For example, in some embodiments, the switch circuit 122 includes a switch. The switch is coupled between the pair of output terminals of the corresponding gain circuit of the amplification circuit 121. As one example, one switch circuit is disposed to be coupled between a pair of output terminals of an output stage of the amplifier circuit. As an another example, a plurality of switch circuits are disposed, each coupled between a pair of output terminals of one gain circuit of at least one gain circuit of the amplifier circuit.

Figure 2:
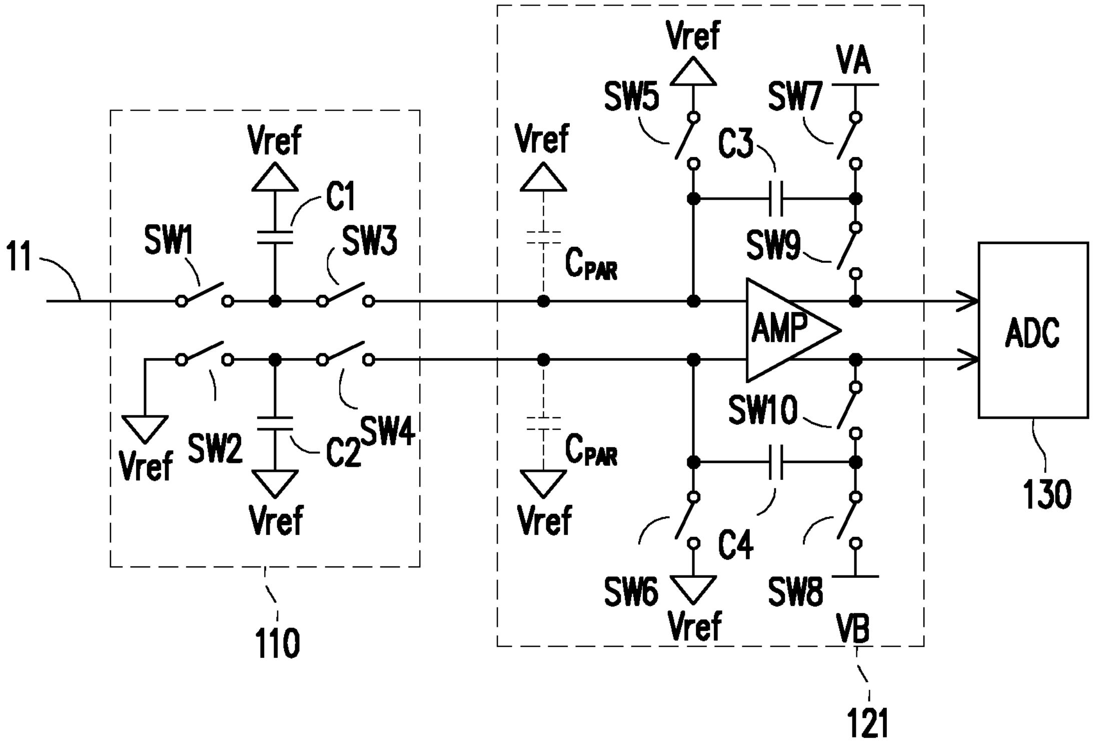
FIG. 2 is a schematic circuit block diagram illustrating the sensing circuit and the amplifier circuit depicted in FIG. 1 according to an embodiment of the invention.

FIG. 2 is a schematic circuit block diagram illustrating the sensing circuit 110 and the amplifier circuit 121 depicted in FIG. 1 according to an embodiment of the invention. In the embodiment illustrated in FIG. 2, the sensing circuit 110 includes a sampling switch SW1, a sampling switch SW2, a sampling capacitor C1, a sampling capacitor C2, a switch circuit SW3 and a switch circuit SW4. A first terminal of the sampling switch SW1 is coupled to the sensing line 11 of the OLED display panel 10, and a first terminal of the sampling switch SW2 is coupled to a reference voltage Vref. A level of the reference voltage Vref may be determined based on a design requirement. For example, the reference voltage Vref may be a common mode voltage, a ground voltage or any other reference voltage. In a sampling period (sensing period), the sampling switch SW1 and the sampling switch SW2 are turned on. In a non-sampling period, the sampling switch SW1 and the sampling switch SW2 are turned off.

A first terminal of the sampling capacitor C1 is coupled to a second terminal of the sampling switch SW1. A second terminal of the sampling capacitor C1 is coupled to the reference voltage Vref. A first terminal of the sampling capacitor C2 is coupled to a second terminal of the sampling switch SW2. A second terminal of the sampling capacitor C2 is coupled to the reference voltage Vref. A first terminal of the switch circuit SW3 is coupled to the first terminal of the sampling capacitor C1. A first terminal of the switch circuit SW4 is coupled to the first terminal of the sampling capacitor C2. Second terminals of the switch circuit SW3 and the switch circuit SW4 serve as the output terminals of the sensing circuit 110. When the sensing line 11 is selected as the current sensing line, in the reset phase, the switch circuit SW3 and the switch circuit SW4 are turned off. When the sensing line 11 is selected as the current sensing line, in the amplification phase, the switch circuit SW3 and the switch circuit SW4 are turned on. When the sensing line 11 is not the current sensing line, the switch circuit SW3 and the switch circuit SW4 are turned off.

In the embodiment illustrated in FIG. 2, the amplifier circuit 121 includes a switch SW5, a switch SW6, a switch SW7, a switch SW8, a switch SW9, a switch SW10, a capacitor C3, a capacitor C4 and an amplifier AMP. A capacitance $C_{PAR}$ illustrated in FIG. 2 represents a parasitic capacitance.

A first terminal of the capacitor C3 is coupled to a first input terminal of the amplifier AMP of the operational amplifier 120. A first terminal of the capacitor C4 is coupled to a second input terminal of the amplifier AMP of the operational amplifier 120. A first terminal of the switch SW5 is coupled to the first terminal of the capacitor C3. A first terminal of the switch SW6 is coupled to the first terminal of the capacitor C4. Second terminals of the sampling switch SW5 and the sampling switch SW6 are coupled to the reference voltage Vref. The level of the reference voltage Vref may be determined based on a design requirement. For example, the reference voltage Vref may be a common mode voltage, a ground voltage or any other reference voltage.

A first terminal of the switch SW9 is coupled to a second terminal of the capacitor C3. A first terminal of the switch SW10 is coupled to a second terminal of the capacitor C4. Second terminals of the switch S9 and the switch SW10 are respectively coupled to a first output terminal and a second output terminal of the amplifier AMP of the operational amplifier 120. The first output terminal and the second output terminal of the amplifier AMP are coupled to the ADC 130. A first terminal of the switch SW7 is coupled to the second terminal of the capacitor C3. A second terminal of the switch SW7 is coupled to a reference voltage VA. A first terminal of the switch SW8 is coupled to the second terminal of the capacitor C4. A second terminal of the switch SW8 is coupled to a reference voltage VB.

Levels of the reference voltage VA and the reference voltage VB may be determined based on a design requirement. For example, the reference voltages VA and VB may have the same voltage level. Alternatively, the amplifier circuit 121 may use different reference voltages VA and VB, so as to generate an offset voltage level at the output terminals of the amplifier AMP.

In the sampling period (sensing period), the pixel information of the sensing line 11 and the reference voltage Vref are respectively stored in the sampling capacitors C1 and C2. In the reset phase, the switch SW9 and the switch SW10 are turned off, and the switch SW5, the switch SW6, the switch SW7 and the switch SW8 are turned on, such that the capacitor C3 and the capacitor C4 respectively store the reference voltage VA and the reference voltage VB.

In the amplification phase, the switch SW9 and the switch SW10 are turned on, and the switch SW5, the switch SW6, the switch SW7 and the switch SW8 are turned off. When the sensing line 11 is selected as the current sensing line, in the amplification phase, the pixel information stored in the sampling capacitors C1 and C2 is transmitted to the input terminals of the amplifier AMP. In an ideal situation (there is neither any parasitic capacitance nor any offset voltage), the amplifier AMP amplifies the pixel information by a parameter of C3/C1 (or C4/C2) to generate an output signal to the ADC 130.

Figure 3:
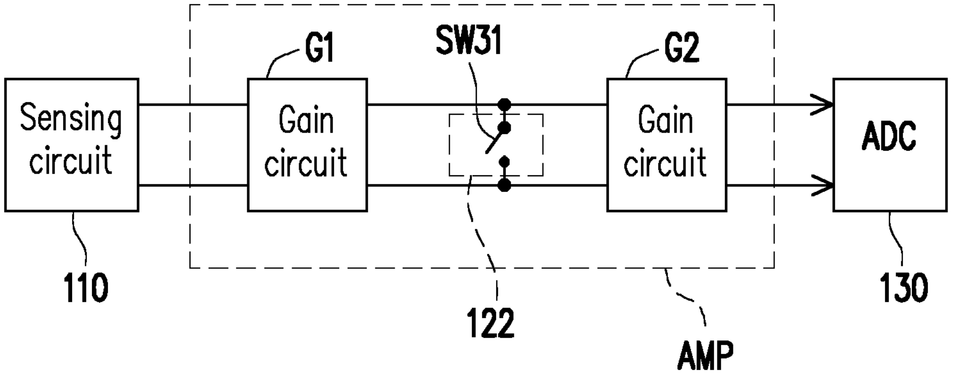
FIG. 3 is a schematic circuit block diagram illustrating the switch circuit depicted in FIG. 1 and the amplifier depicted in FIG. 2 according to an embodiment of the invention.

FIG. 3 is a schematic circuit block diagram illustrating the switch circuit 122 depicted in FIG. 1 and the amplifier AMP depicted in FIG. 2 according to an embodiment of the invention. In the embodiment illustrated in FIG. 3, the amplifier AMP includes a gain circuit G1 and a gain circuit G2. The gain circuit G1 may include the input stage of the amplifier circuit 121, and the gain circuit G2 may include the output stage of the amplifier circuit 121. Input terminals of the gain circuit G1 may serve as the input terminals of the amplifier AMP, so as to couple to the sensing circuit 110. Output terminals of the gain circuit G1 may serve as the output terminals of the amplifier AMP, so as to couple to the ADC 130. The implementation manner of the gain circuits G1 and G2 is not limited in the invention. For example, based on a design requirement, the gain circuit G1 and/or the gain circuit G2 may be conventional gain circuits of a conventional operational amplifier, or alternatively, the gain circuit G1 and/or the gain circuit G2 may be other gain circuits.

In the embodiment illustrated in FIG. 3, the switch circuit 122 includes a switch SW31. A first terminal of the switch SW31 is coupled to a first terminal of the pair of output terminals of the gain circuit G1. A second terminal of the switch SW31 is coupled to a second terminal of the pair of output terminals of the gain circuit G1. In at least some time of the reset phase, the switch SW31 is turned on, and thus, the switch circuit 122 may short output terminals of the gain circuit G1, thus pulling the pair of output voltages output by the pair of output terminals of the gain circuit G1 to the certain voltage. In the amplification phase, the switch SW31 is turned off, and thus, the switch circuit 122 may stop influencing the pair of output voltages output by the pair of output terminals of the gain circuit G1.

Figure 4:
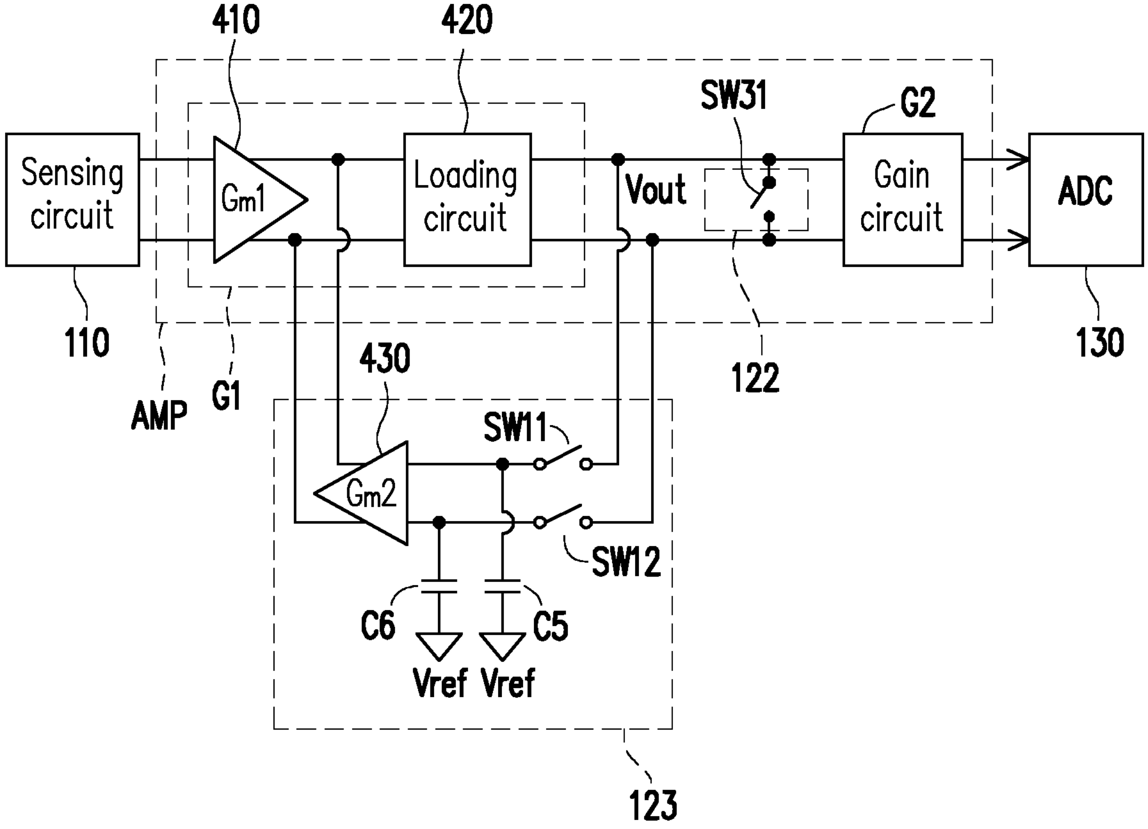
FIG. 4 is a schematic circuit block diagram illustrating the amplifier depicted in FIG. 2 according to another embodiment of the invention.

FIG. 4 is a schematic circuit block diagram illustrating the amplifier AMP depicted in FIG. 2 according to another embodiment of the invention. In the embodiment illustrated in FIG. 4, the amplifier AMP includes a gain circuit G1 and a gain circuit G2. The gain circuit G1, the gain circuit G2 and the switch circuit 122 may be inferred with reference to the descriptions related to FIG. 3 and thus, will not be repeated.

In the embodiment illustrated in FIG. 4, the source driver further includes an offset voltage storing and reducing circuit 123. An output terminal of the offset voltage storing and reducing circuit 123 is coupled to a coupling terminal of the gain circuit G1 of the amplifier circuit 121. Input terminals of the offset voltage storing and reducing circuit 123 are coupled to the output terminals of the gain circuit G1 of the amplifier circuit 121. The offset voltage storing and reducing circuit 123 may be configured to store and reduce an offset voltage of the gain circuit G1 of the amplifier circuit 121. For example, in the reset phase, the offset voltage storing and reducing circuit 123 may store a first voltage received from the output terminals of the gain circuit G1, wherein the first voltage carries information about the offset voltage of the gain circuit G1 of the amplifier circuit 121. In the amplification phase, the offset voltage storing and reducing circuit 123 may output a second voltage to the coupling terminal of the gain circuit G1 of the amplifier circuit 121, wherein the second voltage carries information for reducing the offset voltage of the gain circuit G1 of the amplifier circuit 121.

In the embodiment illustrated in FIG. 4, the gain circuit G1 includes a transconductance circuit 410 and a loading circuit 420. An input terminal of the transconductance circuit 410 is coupled to the sensing circuit 110. The loading circuit 420 is coupled to an output terminal of the transconductance circuit 410 in the gain circuit G1. The output terminal of the transconductance circuit 410 may serve as the coupling terminal of the gain circuit G1. An output terminal of the loading circuit 420 is coupled to the ADC 130. The implementation manners of the transconductance circuit 410 and the loading circuit 420 are not limited in the present embodiment. Based on a design requirement, the transconductance circuit 410 may be a conventional transconductance circuit or other transconductance circuits. Based on a design requirement, the loading circuit 420 may be a conventional loading circuit in a conventional gain circuit, or alternatively, the loading circuit 420 may be other loading circuits. For example, an input pair may serve as the transconductance circuit 410 of the gain circuit G1 of the amplifier circuit 121, and a gain stage may serve as the loading circuit 420 of the gain circuit G1 of the amplifier circuit 121. The output terminal of the offset voltage storing and reducing circuit 123 is coupled to the output terminal (i.e., the coupling terminal of the gain circuit G1) of the transconductance circuit 410. The input terminal of the offset voltage storing and reducing circuit 123 is coupled to the output terminals of the gain circuit G1. The offset voltage storing and reducing circuit 123 may store and reduce the offset voltage of the gain circuit G1.

In the embodiment illustrated in FIG. 4, the offset voltage storing and reducing circuit 123 may include an additional gain circuit coupled to two gain circuits G1 and G2. More specifically, the offset voltage storing and reducing circuit 123 may include a pair of sampling switches (SW11 and SW12), a pair of sampling capacitors (C5 and C6) and a transconductance circuit 430. First terminals of the sampling switch SW11 and the sampling switch SW12 (i.e., the input terminals of the offset voltage storing and reducing circuit 123) are respectively coupled to the two output terminals of the gain circuit G1. In the embodiment illustrated in FIG. 4, the switch SW31 is further coupled to the first terminals of the switch SW11 and the switch SW12. A first terminal of the sampling capacitor C5 is directly coupled to a second terminal of the sampling switch SW11. A first terminal of the sampling capacitor C6 is directly coupled to a second terminal of the sampling switch SW12. Second terminals of the sampling capacitor C5 and the sampling capacitor C6 are coupled to the reference voltage Vref. The level of the reference voltage Vref may be determined based on a design requirement. For example, the reference voltage Vref may be a common mode voltage, a ground voltage or any other reference voltage. Input terminals of the transconductance circuit 430 are coupled to the second terminals of the sampling switch SW11 and the sampling switch SW12. Output terminals of the transconductance circuit 430 (i.e., the output terminals of the offset voltage storing and reducing circuit 123) are coupled to the output terminals (i.e., the coupling terminals of the gain circuit G1) of the transconductance circuit 410. The implementation manner of the transconductance circuit 430 is not limited in the invention. For example, based on a design requirement, the transconductance circuit 430 may be a conventional transconductance circuit or other transconductance circuits.

It is assumed that an offset voltage of the transconductance circuit 410 (i.e., the offset voltage of the gain circuit G1) is Vos1, and an offset voltage of the transconductance circuit 430 is Vos2. Referring to FIG. 2 and FIG. 4, in the reset phase, the switch SW5, the switch SW6, the sampling switch SW11 and the sampling switch SW12 are turned on, the switch circuit SW3 and the switch circuit SW4 are turned off. In this circumstance, an output Vout of the amplifier AMP is −Vos1*Gm1/Gm2−Vos2, wherein Gm1 represents an transconductance value of the transconductance circuit 410, and Gm2 represents an transconductance value of the transconductance circuit 430. The output Vout is stored in the sampling capacitor C5 and the sampling capacitor C6 in the reset phase.

In the amplification phase, the switch SW5, the switch SW6, the sampling switch SW11 and the sampling switch SW12 are turned off, and the switch circuit SW3 and the switch circuit SW4 are turned on. In this circumstance, the offset voltage is Vos'=Vos1/(Gm2*R)+Vos2/(Gm1*R), wherein R represents a resistance value of the loading circuit 420. The input offset voltage Vos1 of the transconductance circuit 410 is divided by an open-loop gain which is Gm2*R, the input offset voltage Vos2 of the transconductance circuit 430 is divided by an open-loop gain which is Gm1*R, and thus, the offset voltage of the amplifier circuit 121 may be effectively reduced. In an actual design, the open-loop gains are usually large enough, and thus, the offset voltages Vos1 and Vos2 may be omitted, such that an input referred offset may be eliminated.

It should be noted that in the amplification phase, the sampling switch SW11 and the sampling switch SW12 are turned off, and thus, the offset voltage storing and reducing circuit 123 does not cause any loading effect to the amplifier circuit 121. Furthermore, because the sampling capacitor C5 and the sampling capacitor C6 are not in a signal path, the sampling capacitor C5 and the sampling capacitor C6 do not influence a capacitance design of the amplifier circuit 121, that is, capacitance values (areas) of the sampling capacitor C5 and the sampling capacitor C6 may be as small as possible.

Figure 5:
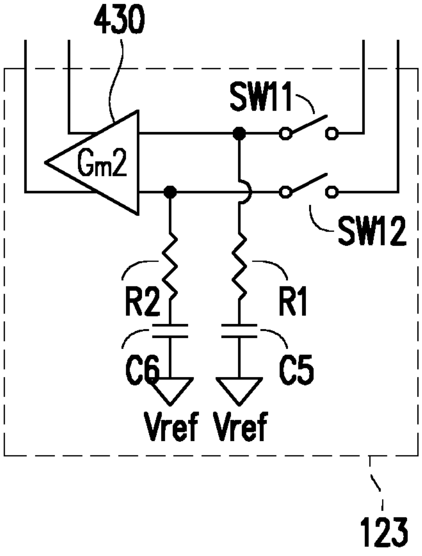
FIG. 5 is a schematic circuit block diagram illustrating the offset voltage storing and reducing circuit according to another embodiment of the invention.

FIG. 5 is a schematic circuit block diagram illustrating the offset voltage storing and reducing circuit 123 according to another embodiment of the invention. In the embodiment illustrated in FIG. 5, the offset voltage storing and reducing circuit 123 includes a sampling switch SW11, a sampling switch SW12, a resistor circuit R1, a resistor circuit R2, a sampling capacitor C5, a sampling capacitor C6 and a transconductance circuit 330. The offset voltage storing and reducing circuit 123, the sampling switch SW11, the sampling switch SW12, the sampling capacitor C5, the sampling capacitor C6 and the transconductance circuit 330 illustrated in FIG. 5 may be inferred with reference to the descriptions related to FIG. 4 and thus, will not be repeated.

In the embodiment illustrated in FIG. 5, a first terminal of the resistor circuit R1 is coupled to the second terminal of the sampling switch SW11. A second terminal of the resistor circuit R1 is coupled to the first terminal of the sampling capacitor C5. A first terminal of the resistor circuit R2 is coupled to the second terminal of the sampling switch SW12. A second terminal of the resistor circuit R2 is coupled to the first terminal of the sampling capacitor C6. The use of the additional resistor circuits R1 and R2 may improve a phase margin of an auxiliary loop. The resistor circuits R1 and R2 may be poly/diffusion resistors, transistors or any devices having limited resistance. The additional resistors R1 and R2 may create a zero point, which may compensate a second pole point to increase the phase margin, thereby loosening the compromised design between the main signal loop and the auxiliary loop.

Figure 6:
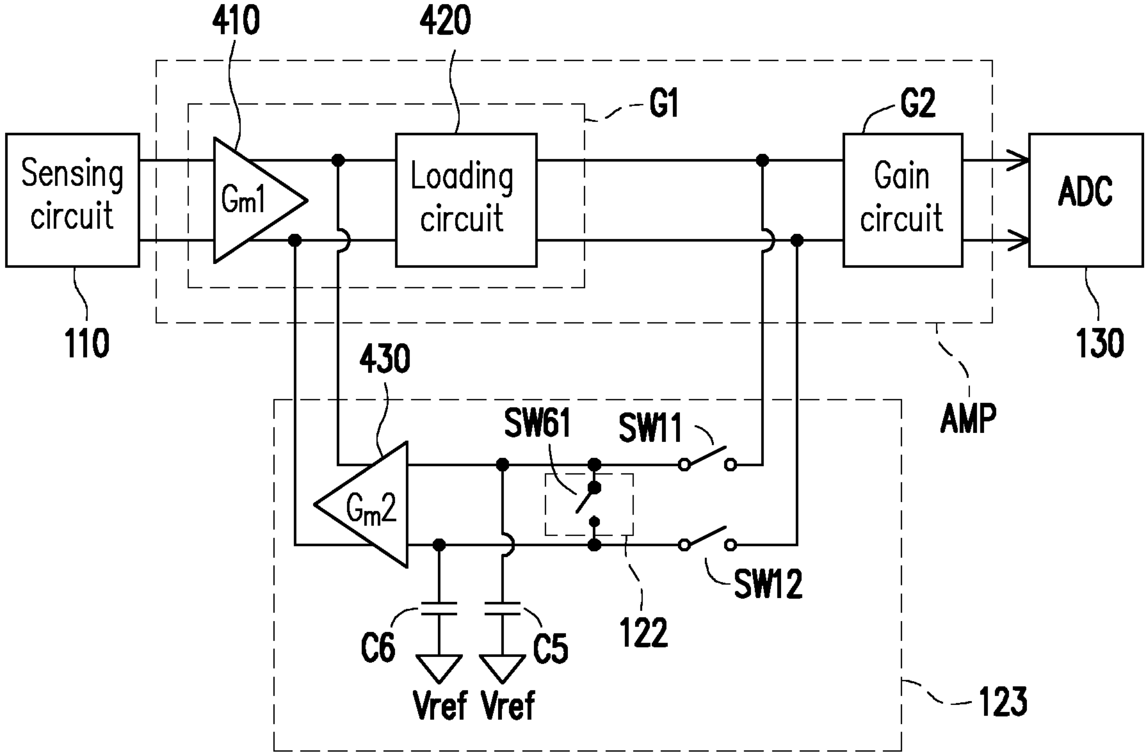
FIG. 6 is a schematic circuit block diagram illustrating the switch circuit according to another embodiment of the invention.

FIG. 6 is a schematic circuit block diagram illustrating the switch circuit 122 according to another embodiment of the invention. A sensing circuit 110, a ADC 130, an amplifier AMP and/or an offset voltage storing and reducing circuit 123 illustrated in FIG. 6 may be inferred with reference to the descriptions related to FIG. 4 or FIG. 5 and thus, will not be repeated.

In the embodiment illustrated in FIG. 6, the switch circuit 122 includes a switch SW61. A first terminal of the switch SW61 is coupled to the first terminal of the sampling capacitor C5 and the second terminal of the sampling switch SW11. A second terminal of the switch SW61 is coupled to the first terminal of the sampling capacitor C6 and the second terminal of the sampling switch SW12. In the first period of the reset phase, the switch SW61 is turned on, and thus, the switch circuit 122 may short the pair of output terminals of the gain circuit G1, thus pulling voltages of the sampling capacitor C5 and the sampling capacitor C6 to the certain voltage between two original levels output from the pair of output terminals of the gain circuit G1. In the second period of the reset phase, the switch SW61 is turned off, and thus, the switch circuit 122 may stop influencing the pair of output voltages output by the pair of output terminals of the gain circuit G1.

Figure 7:
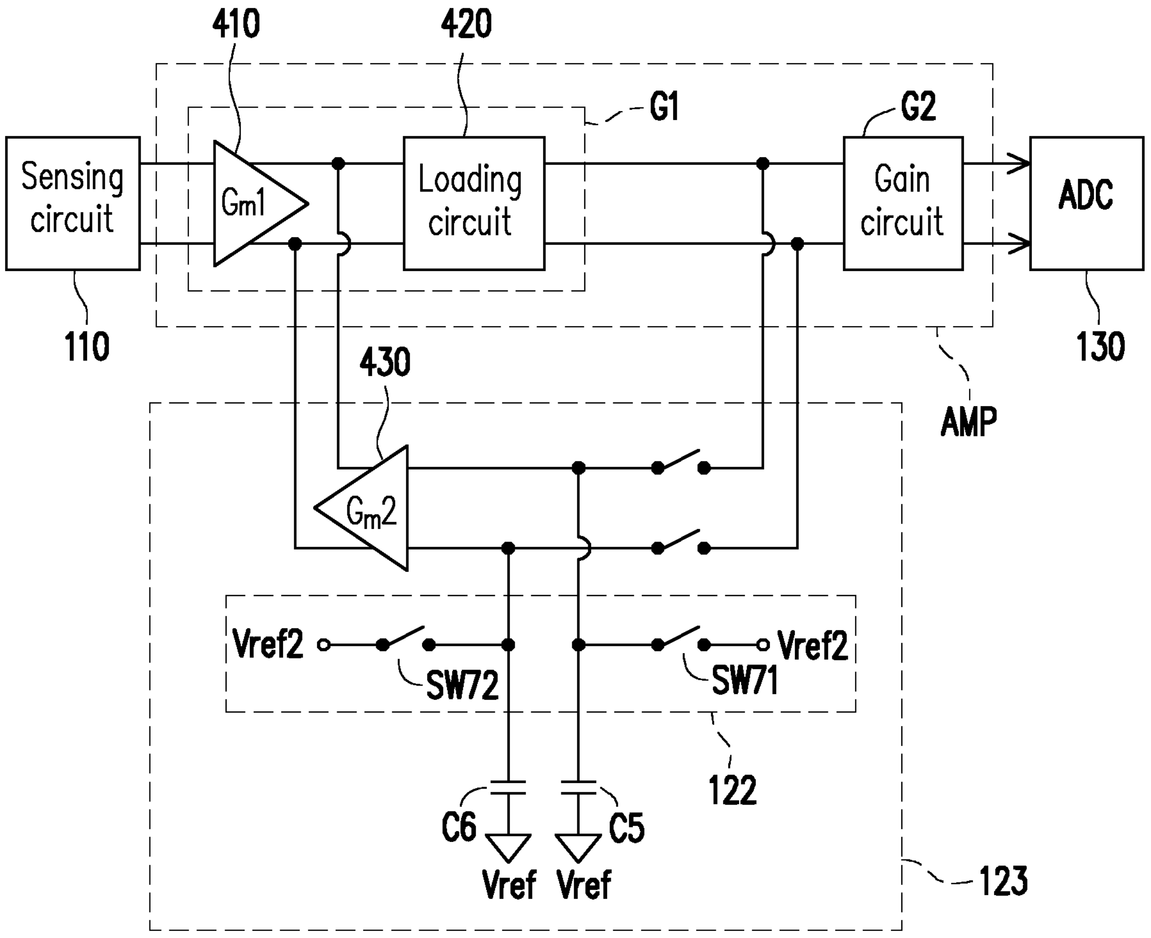
FIG. 7 is a schematic circuit block diagram illustrating the switch circuit according to yet another embodiment of the invention.

FIG. 7 is a schematic circuit block diagram illustrating the switch circuit 122 according to yet another embodiment of the invention. A sensing circuit 110, a ADC 130, an amplifier AMP and/or an offset voltage storing and reducing circuit 123 illustrated in FIG. 7 may be inferred with reference to the descriptions related to FIG. 4 or FIG. 5 and thus, will not be repeated.

In the embodiment illustrated in FIG. 7, the switch circuit 122 includes a pair of switches (SW71 and SW72). An input terminal of the switch SW71 is coupled to the first input terminal of the transconductance circuit 430 of the offset voltage storing and reducing circuit 123, and a second terminal of the switch SW71 is coupled to a reference voltage Vref2 (the certain voltage). A level of the reference voltage Vref2 may be determined based on a design requirement. For example, the reference voltage Vref2 may be a common mode voltage or any other reference voltage. An input terminal of the switch SW72 is coupled to the second input terminal of the transconductance circuit 430 of the offset voltage storing and reducing circuit 123, and a second terminal of the switch SW72 is coupled to the reference voltage Vref2. In the first period of the reset phase, the switch Si and the switch S3 are turned on, and thus, the switch circuit 122 may pull the voltages of the sampling capacitor C5 and the sampling capacitor C6 to the reference voltage Vref2. In the second period of the reset phase, the switch SW71 and the switch SW72 are turned off, and thus, the switch circuit 122 may stop influencing the pair of output voltages output by the pair of output terminals of the gain circuit G1.

Based on the above, the source driver provided by the embodiments of the invention has the switch circuit. The switch circuit is coupled to the pair of output terminals of the gain circuits of the amplification circuit. In the reset phase, the switch circuit can reset the output voltages of the pair of output terminals. Thus, the source driver can mitigate the influence of the pixel information of a previous pixel circuit on the pixel information of a current pixel circuit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A source driver, configured to drive an organic light-emitting diode (OLED) display panel, comprising:

a sensing circuit, configured to sense pixel information of an OLED pixel circuit through a sensing line of the OLED display panel; and an operational amplifier, wherein the operational amplifier comprises:

an amplifier circuit, comprising at least one gain circuit, wherein an input terminal of the amplifier circuit is coupled to an output terminal of the sensing circuit; and at least one switch circuit, each of the at least one switch circuit being coupled between a pair of output terminals of a corresponding one of the at least one gain circuit, wherein each of the at least one switch circuit is configured to short the pair of output terminals of the corresponding gain circuit to pull a pair of output voltages output by the pair of output terminals of the corresponding gain circuit to a certain voltage in a reset phase.

2. The source driver according to claim 1, wherein the certain voltage is at a level between original levels of the pair of the output terminals of the corresponding gain circuit.

3. The source driver according to claim 1, wherein one of the at least one switch circuit is coupled between a pair of output terminals of an output stage of the amplifier circuit.

4. The source driver according to claim 1, wherein the operational amplifier further comprises an additional gain circuit having a pair of output terminals, wherein the pair of output terminals of the additional gain circuit are coupled to a pair of coupling terminals of an input stage of the amplifier circuit.

5. The source driver according to claim 1, wherein the at least one switch circuit is configured to influence the pair of output voltages output by the pair of output terminals of the corresponding one of the at least one gain circuit in a first period of the reset phase and stop influencing the pair of output voltages in a second period of the reset phase.

6. The source driver according to claim 1, wherein the at least one switch circuit is configured to influence the pair of output voltages output at the pair of output terminals of the corresponding one of the at least one gain circuit in the reset phase and stop influencing the pair of output voltages in an amplification phase.

7. The source driver according to claim 1, wherein each of the at least one switch circuit comprises a switch coupled between the pair of output terminals of the corresponding one of the at least one gain circuit.

8. The source driver according to claim 1, further comprising an offset voltage storing and reducing circuit coupled to at least two of the at least one gain circuit.

9. The source driver according to claim 8, wherein an output terminal of the offset voltage storing and reducing circuit is coupled to a coupling terminal of a first gain circuit of the at least one gain circuit of the amplifier circuit, and an input terminal of the offset voltage storing and reducing circuit is coupled to an output terminal of a second gain circuit of the at least one gain circuit of the amplifier circuit.

10. The source driver according to claim 8, wherein the offset voltage storing and reducing circuit is configured to store and reduce an offset voltage of a first gain circuit of the two gain circuits of the amplifier circuit.

11. The source driver according to claim 8, wherein the offset voltage storing and reducing circuit comprises:

a pair of sampling switches, each of the pair of sampling switches having a first terminal coupled to the output terminal of a second one of the two gain circuits of the amplifier circuit;

a pair of sampling capacitors, each of the pair of sampling capacitors being coupled to a second terminal of a corresponding switch of the sampling switches; and a transconductance circuit, having a pair of input terminals coupled to the second terminals of the pair of the sampling switches, wherein each of a pair of output terminals of the transconductance circuit of the offset voltage storing and reducing circuit is coupled to the coupling terminal of a first one of the two gain circuits of the amplifier circuit.

12. The source driver according to claim 11, wherein one of the least one switch circuit comprises a switch coupled between the pair of output terminals of the second gain circuit and coupled to the pair of sampling switches.

13. The source driver according to claim 11, wherein one of the least one switch circuit comprises a switch coupled between the pair of sampling capacitors and the pair of input terminals of the transconductance circuit of the offset voltage storing and reducing circuit.

14. The source driver according to claim 11, wherein one of the least one switch circuit comprises a pair of switches, and each of the pair of switches is coupled between one of the pair of input terminals of the transconductance circuit of the offset voltage storing and reducing circuit and a reference voltage.

* * * * *